United States Patent
Long et al.

(10) Patent No.: US 12,121,854 B2
(45) Date of Patent: Oct. 22, 2024

(54) DEVICE AND METHOD FOR CONTINUOUS $CO_2$ CAPTURE BY DOUBLE-BED HYDRATE PROCESS

(71) Applicant: GUANGZHOU INSTITUTE OF ENERGY CONVERSION, CHINESE ACADEMY OF SCIENCES, Guangzhou (CN)

(72) Inventors: Zhen Long, Guangzhou (CN); Yong He, Guangzhou (CN); Deqing Liang, Guangzhou (CN); Xuebing Zhou, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 18/575,341

(22) PCT Filed: Dec. 17, 2021

(86) PCT No.: PCT/CN2021/139064
§ 371 (c)(1),
(2) Date: Dec. 29, 2023

(87) PCT Pub. No.: WO2022/096026
PCT Pub. Date: May 12, 2022

(65) Prior Publication Data
US 2024/0261728 A1 Aug. 8, 2024

(30) Foreign Application Priority Data

Jul. 2, 2021 (CN) .......................... 202110750182.4

(51) Int. Cl.
*B01D 53/62* (2006.01)
*B01D 53/00* (2006.01)
(Continued)

(52) U.S. Cl.
CPC .......... *B01D 53/62* (2013.01); *B01D 53/002* (2013.01); *B01D 53/78* (2013.01); *C01B 32/50* (2017.08); *B01D 2257/504* (2013.01)

(58) Field of Classification Search
CPC ...... B01D 53/62; B01D 53/002; B01D 53/78; B01D 2257/504; C01B 32/50
See application file for complete search history.

(56) References Cited

U.S. PATENT DOCUMENTS 6,350,928 B1    2/2002   Waycuilis et al.

FOREIGN PATENT DOCUMENTS

| CN | 101225338 B | 3/2011 |
| CN | 101456556 B | 5/2011 |

(Continued)

OTHER PUBLICATIONS

Praveen Linga, et al., Enhanced rate of gas hydrate formation in a fixed bed column filled with sand compared to a stirred vessel, Chemical Engineering Science, 2012, pp. 617-623, vol. 68.

*Primary Examiner* — Emmanuel E Duke
(74) *Attorney, Agent, or Firm* — Bayramoglu Law Offices LLC

(57) ABSTRACT

A device and a method for continuous $CO_2$ capture by a double-bed hydrate process are provided. The device includes a first fixed-bed hydrate reactor, a second fixed-bed hydrate reactor, a solution circulation system, a gas inlet system and an exhaust system; the first fixed-bed hydrate reactor and the second fixed-bed hydrate reactor are respectively connected in series with the gas inlet system, the exhaust system and the solution circulation system, and are connected in parallel; the refrigerant fluid and the heat medium fluid output by a compression-refrigeration system alternately flow into a heat exchange coil of the first fixed-bed hydrate reactor and a heat exchange coil of the second fixed-bed hydrate reactor, and the two fixed-bed hydrate (Continued)

reactors are alternately subjected to hydrate formation and decomposition reactions to realize continuous $CO_2$ capture and separation.

6 Claims, 2 Drawing Sheets

(51) Int. Cl.
*B01D 53/78* (2006.01)
*C01B 32/50* (2017.01)

(56) References Cited

FOREIGN PATENT DOCUMENTS

| | | | | | |
|---|---|---|---|---|---|
| CN | 102432008 | B | | 1/2013 | |
| CN | 104289083 | A | | 1/2015 | |
| CN | 104495964 | A | * | 4/2015 | ............... C02F 1/00 |
| CN | 103964434 | B | | 10/2015 | |
| CN | 107115776 | A | * | 9/2017 | ............... C04B 7/44 |
| CN | 107903969 | A | | 4/2018 | |
| CN | 106474904 | B | | 3/2019 | |
| CN | 109631415 | A | | 4/2019 | |
| CN | 110090543 | A | * | 8/2019 | ............ B01D 53/62 |
| CN | 212167394 | U | | 12/2020 | |
| CN | 113477051 | A | | 10/2021 | |
| JP | H0596131 | A | | 4/1993 | |
| JP | 2005247919 | A | | 9/2005 | |
| KR | 20130055741 | A | | 5/2013 | |

* cited by examiner

DEVICE AND METHOD FOR CONTINUOUS CO₂ CAPTURE BY DOUBLE-BED HYDRATE PROCESS

CROSS REFERENCE TO THE RELATED APPLICATIONS

This application is the national phase entry of International Application No. PCT/CN2021/139064, filed on Dec. 17, 2021, which is based upon and claims priority to Chinese Patent Application No. 202110750182.4, filed on Jul. 2, 2021, the entire contents of which are incorporated herein by reference.

TECHNICAL FIELD

The present invention belongs to the field of hydrate application technologies, and particularly relates to a device and method for continuous $CO_2$ capture by a double-bed hydrate process.

BACKGROUND

With the global greenhouse effect and climate change problems becoming more and more serious, $CO_2$ capture and storage technologies have attracted more and more attention. At present, the commonly used $CO_2$ capture and separation technologies in industry are mainly chemical absorption and pressure swing adsorption. An absorbent of the former has fluidity and can realize continuous gas separation, but is high in desorption energy efficiency and generally corrosive. An adsorbent of the latter is generally a porous medium, such as activated carbon and molecular sieve, and slightly low in regeneration energy consumption, but has problems such as complicated switching operation and low adsorbent recovery rate. The $CO_2$ separation technology by a hydrate process realizes gas separation by using different thermodynamic conditions for different gases to form the hydrates, does not need to recycle and post-treat a separation medium, and has characteristics such as simple process flow, lower energy consumption and environmental friendliness.

However, there are some problems in the current $CO_2$ separation technology by a hydrate process, such as slow hydration rate, easy blockage of solid hydrates due to lack of fluidity, and incapability of continuous gas separation, which greatly restrict the industrial application of such technology. In view of the shortcomings of stirring, bubbling, spraying and other traditional reactors, researchers constantly optimize the reactor structures to strengthen the heat and mass transfer during hydration reaction. For example, CN101456556B (2011) discloses a device and method for continuous $CO_2$ separation from mixed gas by a hydrate process, which integrates bubbling, spraying and micro-bubble jet reaction technologies and a $CO_2$ reflux displacement fractionation technology. CN101225338B (2011) discloses a method and device for rapid preparation of a natural gas hydrate by static supergravity. CN212167394U (2020) discloses a gas hydrate formation device based on a double-electrode electrostatic spraying method. CN107903969A (2018) adopts a spiral flow and Laval nozzle two-stage hydrate preparation device for reaction, which improves a hydrate formation rate. CN106474904B (2019) proposes to combine a Laval nozzle and a Venturi ejector to increase the gas flow rate at the inlet of a tubular hydrate reactor, promote gas-liquid mixing, enhance the heat and mass transfer of hydrate formation, and couple a chemical absorption method so as to improve the continuous separation efficiency of $CO_2$ gas. Linga et al. (Chemical Engineering Science 68 (2012) 617-623) found that the mixed gas hydrate in a fixed-bed reactor filled with quartz sand has faster reaction rate, higher water conversion rate and larger separation factor than those in a kettle agitator. CN102432008B (2013) discloses a ring-shaped separation tower to realize $CO_2$ capture by the hydrate process, a porous medium material is loaded in the annular gap formed by two inner and outer concentric baffles, and compared with an axial fixed-bed reactor, the gas radially flows along a bed layer, and the flow resistance is reduced. Foreign scholars (JP2005247919A and U.S. Pat. No. 6,350,928) found a fluidized-bed hydrate reactor, which fluidizes particles depending on the gas flowing upward at high speed in the reactor, the gas-liquid contact area is updated quickly, the heat and mass transfer effect is good and the hydrate reaction is intense. In order to quickly remove hydrate reaction heat and ensure uniform temperature of a bed layer, the researchers proposed to dispose a shell and tube cooler in the bed, but a fluid reaction space was thus reduced. CN103964434B (2015) designs a two-stage serial fluidized-bed hydrate reactor filled with THF/SDS mixed liquids and porous silica gel to improve the material utilization rate and avoid blocking pores of a porous medium due to hydrate formation, but only realizes intermittent $CO_2$ capture. In order to continuous $CH_4/CO_2$ separation, CN110090543A (2019) proposes a hydrate formation-decomposition system including a shell and tube fluidized-bed reactor and a cyclone separator, but the gas flow and bed layer particles are easy for back mixing, the gas-liquid contact is poor, and the actual separation efficiency cannot reach an expected value.

SUMMARY

An objective of the present invention is to provide a device and method for continuous $CO_2$ capture by a double-bed hydrate process.

In order to achieve the above objective, the technical solution of the present invention is as follows:

A device for continuous $CO_2$ capture by a double-bed hydrate process includes:
- a first fixed-bed hydrate reactor and a second fixed-bed hydrate reactor, which are each provided with a heat exchange coil therein and filled with a porous medium;
- a compression-refrigeration system, including an evaporator, a compressor, a condenser and a throttle valve, which are sequentially connected in series to form a compression-refrigeration circulation loop, wherein the evaporator is respectively connected with the heat exchange coil of the first fixed-bed hydrate reactor and the heat exchange coil of the second fixed-bed hydrate reactor to form a refrigerant fluid circulation loop, so as to provide cool energy for reactor hydrate formation, and the condenser is respectively connected with the heat exchange coil of the first fixed-bed hydrate reactor and the heat exchange coil of the second fixed-bed hydrate reactor to form a heating loop, so as to provide heat for reactor hydrate decomposition;
- a solution circulation system, including a solution circulation tank, wherein the solution circulation tank includes two adjacent cavity bodies capable for heat exchange, one cavity body is connected with the first fixed-bed hydrate reactor to form a reaction liquid circulation loop, and the other cavity body is connected with the second fixed-bed hydrate reactor to form a reaction liquid circulation loop;

a gas inlet system, including a raw gas cylinder which is respectively connected with a raw gas inlet of the first fixed-bed hydrate reactor and a raw gas inlet of the second fixed-bed hydrate reactor through pipelines; and an exhaust system, including a residual gas storage tank and a high-concentration $CO_2$ gas cylinder, wherein the residual gas storage tank and the high-concentration $CO_2$ gas cylinder are respectively connected with an exhaust port of the first fixed-bed hydrate reactor and an exhaust port of the second fixed-bed hydrate reactor through pipelines; wherein a refrigerant fluid and a heat medium fluid output by the compression-refrigeration system alternately flow into the heat exchange coil of the first fixed-bed hydrate reactor and the heat exchange coil of the second fixed-bed hydrate reactor, and the two fixed-bed hydrate reactors are alternately subjected to hydrate formation and decomposition reactions to realize continuous $CO_2$ capture and separation.

A method for continuous $CO_2$ capture by a double-bed hydrate process is implemented based on the above device and includes the following steps:

(1) when the hydrate formation of the second fixed-bed hydrate reactor is finished and the hydrate formation of the first fixed-bed hydrate reactor is started, the raw gas cylinder stops supplying gas to the second fixed-bed hydrate reactor, the reaction liquid stops flowing into the second fixed-bed hydrate reactor, the cold residual reaction liquid flows back to the corresponding cavity body of the solution circulation tank from a reaction liquid outlet of the second fixed-bed hydrate reactor, residual low-concentration $CO_2$ mixed gas flows out from the exhaust port of the second fixed-bed hydrate reactor to the residual gas storage tank, the refrigerant fluid stops entering the second fixed-bed hydrate reactor, the heat medium fluid flows into and heats the second fixed-bed hydrate reactor, and the hydrate in the second fixed-bed hydrate reactor absorbs heat to be decomposed to release high-concentration $CO_2$ mixed gas and reaction liquid; the refrigerant fluid flows into and cools the first fixed-bed hydrate reactor, and the mixed gas from the raw gas cylinder flows into the first fixed-bed hydrate reactor at a constant flow rate through a booster pump to be subjected to hydrate formation reaction with the reaction liquid from the corresponding cavity body of the solution circulation tank;

(2) the high-concentration $CO_2$ mixed gas flows into the high-concentration $CO_2$ gas cylinder from the exhaust port of the second fixed-bed hydrate reactor;

(3) when the hydrate decomposition of the second fixed-bed hydrate reactor is finished, the gas stops flowing out of the second fixed-bed hydrate reactor; the hot reaction liquid flows into the corresponding cavity body of the solution circulation tank from the reaction liquid outlet of the second fixed-bed hydrate reactor to be precooled, and then flows back to the second fixed-bed hydrate reactor through a circulation pump; the heat medium fluid stops flowing into the second fixed-bed hydrate reactor, and the refrigerant fluid flows into and cools the second fixed-bed hydrate reactor;

(4) when the hydrate formation of the first fixed-bed hydrate reactor is finished and the hydrate formation of the second fixed-bed hydrate reactor is started, the raw gas cylinder stops supplying gas to the first fixed-bed hydrate reactor, the reaction liquid stops flowing into the first fixed-bed hydrate reactor, the cold residual reaction liquid flows back to the corresponding cavity body of the solution circulation tank from a reaction liquid outlet of the first fixed-bed hydrate reactor, the residual low-concentration $CO_2$ mixed gas flows out from the exhaust port of the first fixed-bed hydrate reactor to the residual gas storage tank, the refrigerant fluid stops entering the first fixed-bed hydrate reactor, the heat medium fluid flows into and heats the first fixed-bed hydrate reactor, and the hydrate in the first fixed-bed hydrate reactor absorbs heat to be decomposed to release high-concentration $CO_2$ mixed gas and reaction liquid; the refrigerant fluid flows into and cools the second fixed-bed hydrate reactor, and the mixed gas from the raw gas cylinder enters the second fixed-bed hydrate reactor at a constant flow rate through the booster pump to be subjected to hydrate formation reaction with the reaction liquid from the corresponding cavity body of the solution circulation tank;

(5) the high-concentration $CO_2$ mixed gas flows into the high-concentration $CO_2$ gas cylinder from the exhaust port of the first fixed-bed hydrate reactor; and (6) when the hydrate decomposition of the first fixed-bed hydrate reactor is finished, the gas stops flowing out of the first fixed-bed hydrate reactor; the hot reaction liquid flows into the corresponding cavity body of the solution circulation tank from the reaction liquid outlet of the first fixed-bed hydrate reactor to be precooled, and then flows into the first fixed-bed hydrate reactor through the circulation pump; the heat medium fluid stops flowing into the first fixed-bed hydrate reactor, the refrigerant fluid flows into and cools the first fixed-bed hydrate reactor, and step 1) is returned.

Compared with the prior art, the present invention has the following advantages:

1. The two fixed-bed hydrate reactors are used to alternately perform hydrate formation and decomposition to realize dynamic continuous $CO_2$ separation, which can not only improve the recycling rate of materials, but also effectively improve the separation efficiency.

2. The compression-refrigeration system is used to effectively couple hydrate formation heat and hydrate decomposition heat, so as to improve the energy utilization efficiency.

3. By using the double-cavity structure of the solution circulation tank, the energy loss and external energy input are reduced by heat exchange and precooling between the internal reaction liquids.

The present invention can be applied to the continuous $CO_2$ separation in mixed gases such as coalbed methane, flue gas ($CO_2/N_2$), IGCC synthesis gas, biomass synthesis gas ($CO_2/H_2$) and biogas ($CO_2/CH_4$).

DETAILED DESCRIPTION OF THE EMBODIMENTS

In order to make the above objectives, features and advantages of the present invention more obvious and easier to understand, the present invention will be further described in detail in combination with the accompanying drawings and specific embodiments.

Embodiment 1

Figure 1:
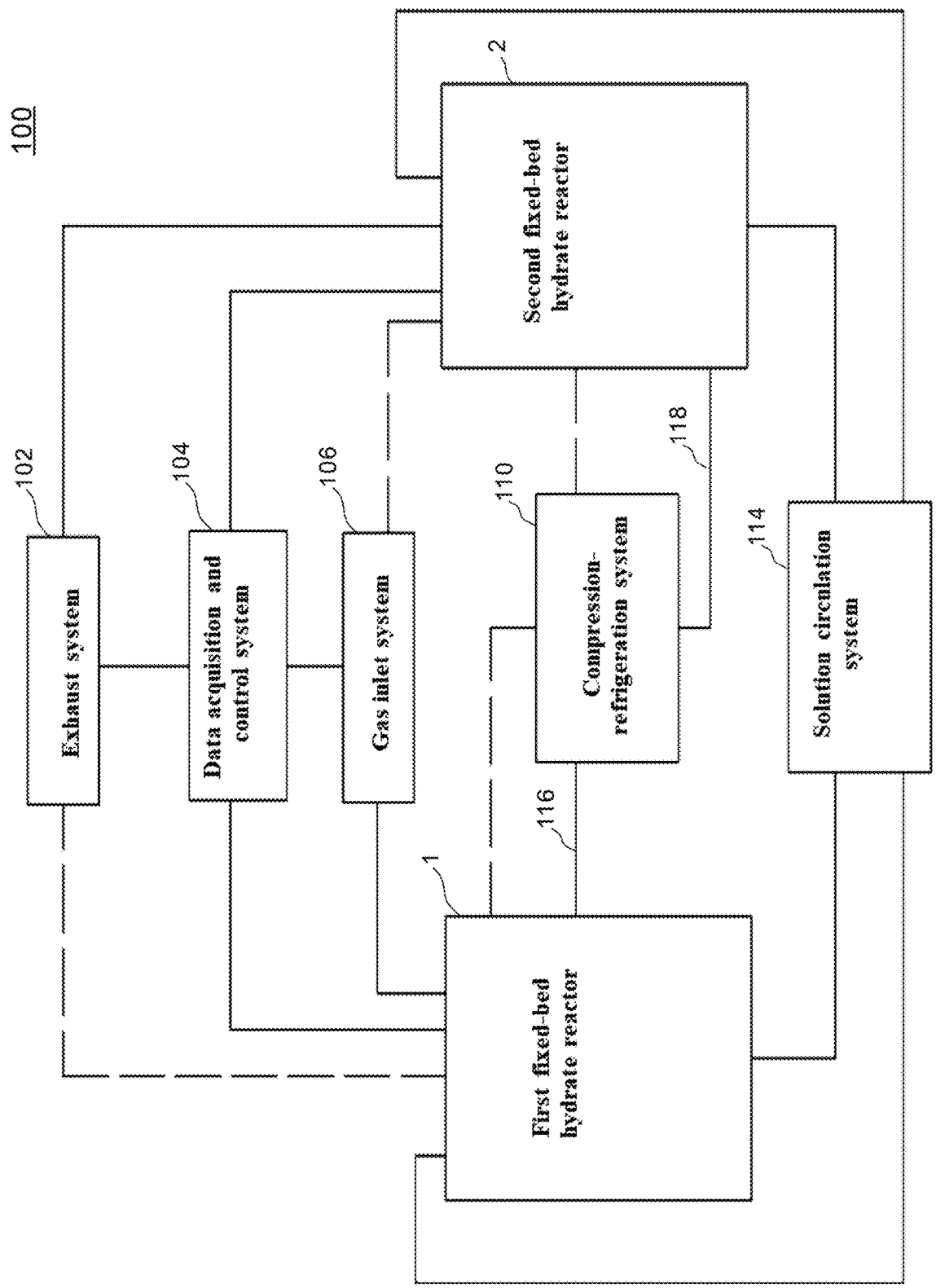
FIG. 1 is a working principle block diagram of a device for continuous $CO_2$ capture by a double-bed hydrate process according to the present invention.

As shown in FIG. 1, a device 100 for continuous $CO_2$ capture by a double-bed hydrate process mainly includes a first fixed-bed hydrate reactor 1, a second fixed-bed hydrate reactor 2, a compression-refrigeration system 110, a solution circulation system 114, a gas inlet system 106, an exhaust system 102 and a data acquisition and control system 104.

The first fixed-bed hydrate reactor and the second fixed-bed hydrate reactor are respectively connected in series with the gas inlet system, the exhaust system and the solution circulation system, and the first fixed-bed hydrate reactor and the second fixed-bed hydrate reactor are connected in parallel. A refrigerant fluid 116 and a heat medium fluid 118 output by the compression-refrigeration system alternately flow into a heat exchange coil of the first fixed-bed hydrate reactor and a heat exchange coil of the second fixed-bed hydrate reactor, and the two fixed-bed hydrate reactors are alternately subjected to hydrate formation and decomposition reactions, so as to realize continuous $CO_2$ capture and separation.

The data acquisition and control system is electrically connected with sensing elements of the first fixed-bed hydrate reactor, the second fixed-bed hydrate reactor, the compression-refrigeration system, the solution circulation system and the exhaust system respectively, so as to acquire and process sensing signals of respective sensing elements and automatically control operation of the device.

Figure 2:
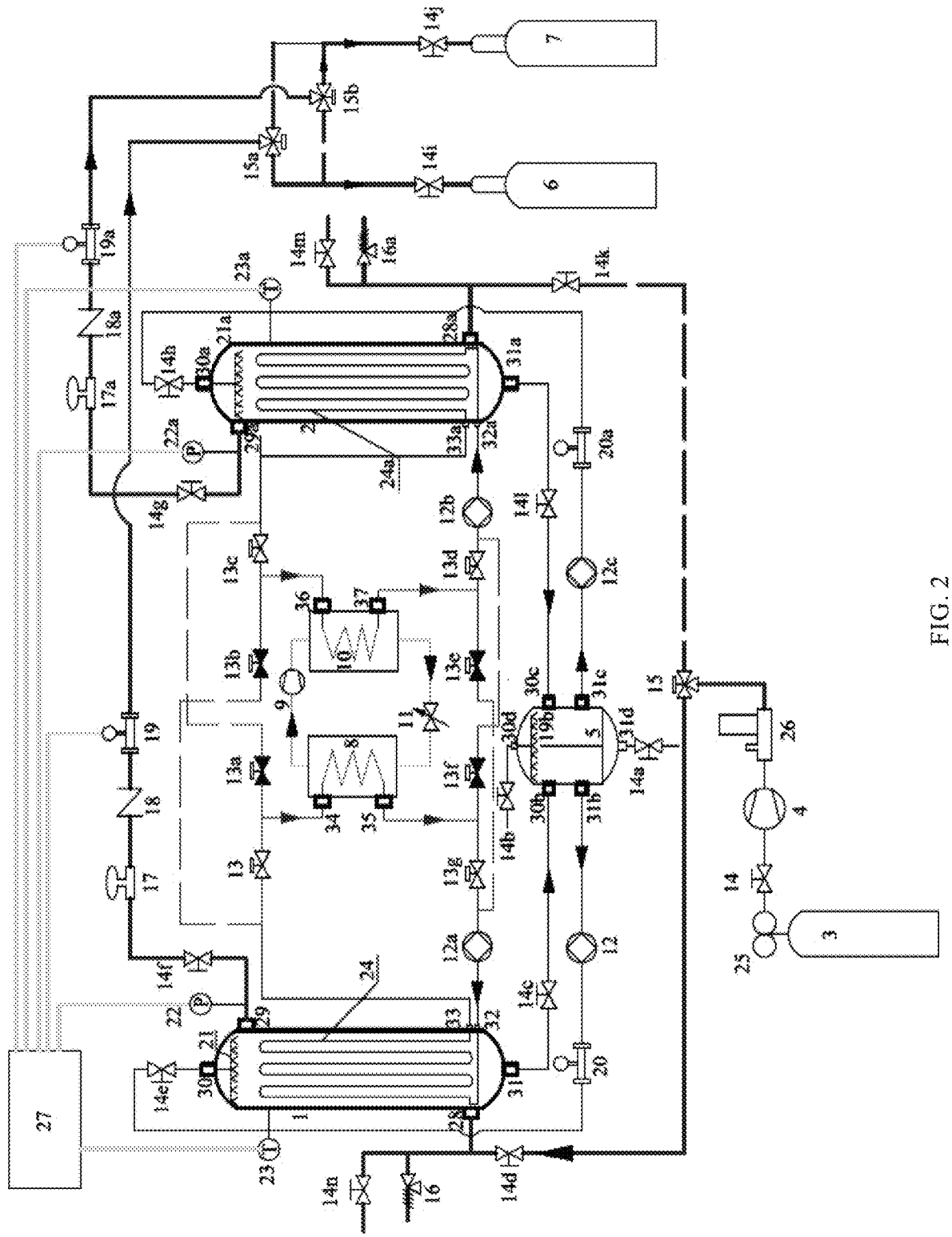
FIG. 2 is a schematic structural diagram of a device for continuous $CO_2$ capture by a double-bed hydrate process according to the present invention.

As shown in FIG. 2, the first fixed-bed hydrate reactor 1 and the second fixed-bed hydrate reactor 2 have the same structure, both adopt a high pressure-resistant stainless steel structure and are filled with porous medium materials therein. Preferably, the porous medium material is selected from one of silica gel, quartz sand, SBA-15, CMK-3 and ZIF-8. The first fixed-bed hydrate reactor 1 and the second fixed-bed hydrate reactor 2 are respectively provided with a first heat exchange coil 24 and a second heat exchange coil 24a therein, and the coils are filled with a heat exchange fluid (that is, the refrigerant fluid or heat medium fluid of the compression-refrigeration system).

Top centers of the first fixed-bed hydrate reactor 1 and the second fixed-bed hydrate reactor 2 are respectively provided with a first reaction liquid inlet 30 and a second reaction liquid inlet 30a, the upper parts of side surfaces are respectively provided with a first exhaust port 29 and a second exhaust port 29a which are used for connecting a first back pressure valve 17 and a second back pressure valve 17a of an exhaust system pipeline, and the connecting pipelines of the two are respectively provided with a first pressure sensor 22, a first exhaust valve 14f, a second pressure sensor 22a and a second exhaust valve 14g.

A first reaction liquid outlet 31 and a second reaction liquid outlet 31a are respectively disposed in bottom centers of the first fixed-bed hydrate reactor 1 and the second fixed-bed hydrate reactor 2, and side walls are respectively provided with a first heat exchange fluid inlet 32, a first heat exchange fluid outlet 33, a second heat exchange fluid inlet 32a, a second heat exchange fluid outlet 33a, a first thermocouple interface 23 and a second thermocouple interface 23a which are communicated with the heat exchange coils.

The lower parts of the side surfaces of the first fixed-bed hydrate reactor 1 and the second fixed-bed hydrate reactor 2 are respectively provided with a first raw gas inlet 28 and a second raw gas inlet 28a which are used for connecting a gas flow control valve 26 of the gas inlet system, and the connecting pipelines of the two are respectively provided with a first gas inlet valve 14d and a second gas inlet valve 14k.

The first fixed-bed hydrate reactor 1 and the second fixed-bed hydrate reactor 2 are respectively provided with a first nozzle 21 and a second nozzle 21a, which are respectively disposed between the tops of the first fixed-bed hydrate reactor 1 and the second fixed-bed hydrate reactor 2 and the first heat exchange coil 24 and the second heat exchange coil 24a and are respectively connected with the first liquid inlet 30 and the second liquid inlet 30a, and the connecting pipelines between the two are respectively provided with a first liquid inlet valve 14e and a second liquid inlet valve 14h which are used for uniform feeding of the reaction liquid.

The compression-refrigeration system is mainly composed of an evaporator 8, a compressor 9, a condenser 10 and a throttle valve 11 which are connected in series in sequence to form a compression-refrigeration circulation loop, and R410A is adopted as a compression-refrigeration circulation working medium. The evaporator 8 is provided with a refrigerant fluid inlet 34 and a refrigerant fluid outlet 35, which provide cold energy for hydrate formation in the reactor. The condenser 10 is provided with a heat medium fluid inlet 36 and a heat medium fluid outlet 37, which provide heat for hydrate decomposition in the reactor. Both the heat medium fluid and the refrigerant fluid adopt a 50% ethylene glycol-water solution.

The first heat exchange fluid inlet 32 of the first fixed-bed hydrate reactor 1 is respectively connected with the heat medium fluid outlet 37 and the refrigerant fluid outlet 35 of the compression-refrigeration system through a third circulation pump 12a, and the first heat exchange fluid outlet 33 of the first fixed-bed hydrate reactor 1 is respectively connected with the heat medium fluid inlet 36 and the refrigerant fluid inlet 34 of the compression-refrigeration system. The connecting pipelines are provided with a first refrigerant valve 13g for controlling the refrigerant fluid to flow into the first fixed-bed hydrate reactor 1, a second refrigerant valve 13 for controlling the refrigerant fluid to flow out of the first fixed-bed hydrate reactor 1, a first heat medium valve 13e for controlling the heat medium fluid to flow into the first fixed-bed hydrate reactor 1, and a second heat medium valve 13b for controlling the heat medium fluid to flow out of the first fixed-bed hydrate reactor 1.

The second heat exchange fluid inlet 32a of the second fixed-bed hydrate reactor 2 is respectively connected with the heat medium fluid outlet 37 and the refrigerant fluid outlet 35 of the compression-refrigeration system through a fourth circulation pump 12b, and the second heat exchange fluid outlet 33a of the second fixed-bed hydrate reactor is respectively connected with the heat medium fluid inlet 36 and the refrigerant fluid inlet 34 of the compression-refrigeration system. The connecting pipelines are provided with a third refrigerant valve 13f for controlling the refrigerant fluid to flow into the second fixed-bed hydrate reactor 2, a fourth refrigerant valve 13a for controlling a cold source fluid to flow out of the second fixed-bed hydrate reactor 2, a third heat medium valve 13d for controlling the heat medium fluid to flow into the second fixed-bed hydrate reactor 2, and a fourth heat medium valve 13e for controlling the heat medium fluid to flow out of the second fixed-bed hydrate reactor 2.

The solution circulation system is mainly composed of a solution circulation tank 5, a first circulation pump 12 and a second circulation pump 12c. The solution circulation tank 5 is made of stainless steel and internally divided into a left cavity body and a right cavity body by a vertical steel plate, and the cold and hot reaction liquids in the two cavity bodies can exchange heat through the steel plate to realize heat exchange and precooling of the reaction liquids. Preferably, the reaction liquid is selected from at least one of surfactants SDS, THF and TBAB, and a concentration of the reaction liquid is 0-20 wt %. The wall surface of the left cavity body is provided with a first reaction liquid inlet 30b, which is connected with the first reaction liquid outlet 31 of the first fixed-bed hydrate reactor 1 through a first drain valve 14c, and a first reaction liquid outlet 31b is disposed at a radially symmetrical position and is connected with the first reaction liquid inlet 30 of the first fixed-bed hydrate reactor 1 through the first circulation pump 12, a first liquid flowmeter 20 and the first liquid inlet valve 14e. The wall surface of the right cavity body is provided with a second reaction liquid inlet 30c, which is connected with the second reaction liquid outlet 31a of the second fixed-bed hydrate reactor 2 through a second drain valve 14l, and a second reaction liquid outlet 31c is disposed at a radially symmetrical position and is connected with the second reaction liquid inlet 30a of the second fixed-bed hydrate reactor 2 through the second circulation pump 12c, a second liquid flowmeter 20a and the second liquid inlet valve 14h. The top center of the solution circulation tank 5 is provided with a reaction liquid inlet 30d connected with a spray nozzle 19b, and the bottom center is provided with a drain port 31d for replacing the liquid in the solution circulation tank 5. The connecting pipelines are respectively provided with a reaction liquid inlet valve 14b and a reaction liquid outlet valve 14a.

The gas inlet system includes a raw gas cylinder 3 and a gas booster pump 4, one end of the gas booster pump 4 is connected with the raw gas cylinder 3, and the connecting pipeline is provided with a control valve 14. The raw gas cylinder 3 is provided with a pressure reducing valve 25, and the other end of the gas booster pump 4 is respectively connected with the first raw gas inlet 28 of the first fixed-bed hydrate reactor 1 and the second raw gas inlet 28a of the second fixed-bed hydrate reactor 2 through the gas flow control valve 26 and a first electromagnetic three-way valve 15. The connecting pipelines are provided with the first gas inlet valve 14d for controlling gas to flow into the first fixed-bed hydrate reactor 1 and the second gas inlet valve 14k for controlling gas to flow into the second fixed-bed hydrate reactor 2, and are respectively provided with a first safety valve 16, a second exhaust valve 14n, a second safety valve 16a and a second exhaust valve 14m.

The exhaust system includes a residual gas storage tank 6 and a high-concentration $CO_2$ gas cylinder 7. The first exhaust valve 14f connected with the first exhaust port 29 of the first fixed-bed hydrate reactor 1 is connected with a first gas inlet valve 14i of the residual gas storage tank 6 and a second gas inlet valve 14j of the high-concentration $CO_2$ gas cylinder 7 respectively by a second electromagnetic three-way valve 15a through pipelines. The first back pressure valve 17, a first check valve 18 and a first gas flowmeter 19 are disposed between the first exhaust valve 14f and the second electromagnetic three-way valve 15a. The second exhaust valve 14g connected with the second exhaust port 29a of the second fixed-bed hydrate reactor 2 is connected with the first gas inlet valve 14i of the residual gas storage tank 6 and the second gas inlet valve 14j of the high-concentration $CO_2$ gas cylinder 7 respectively by a third electromagnetic three-way valve 15b through pipelines. The second back pressure valve 17a, a second check valve 18a and a second gas flowmeter 19a are disposed between the second exhaust valve 14g and the third electromagnetic three-way valve 15b.

The data acquisition and control system 27 monitors, displays and stores working pressure, temperature, flow and other signals in real time by using the pressure sensors, thermocouples, the gas flowmeters and the liquid flowmeters, and controls the on-off switching of all valves to realize automatic operation.

Embodiment 2

Based on the device for continuous $CO_2$ capture by a double-bed hydrate process according to Embodiment 1, the present embodiment provides a method for continuous $CO_2$ capture by a double-bed hydrate process, which includes the following steps:

(1) when the hydrate formation of the second fixed-bed hydrate reactor is finished and the hydrate formation of the first fixed-bed hydrate reactor is started, the raw gas cylinder stops supplying gas to the second fixed-bed hydrate reactor, the reaction liquid stops flowing into the second fixed-bed hydrate reactor, the cold residual reaction liquid flows back to the corresponding cavity body of the solution circulation tank from a reaction liquid outlet of the second fixed-bed hydrate reactor, residual low-concentration $CO_2$ mixed gas flows out from the exhaust port of the second fixed-bed hydrate reactor to the residual gas storage tank, the refrigerant fluid stops entering the second fixed-bed hydrate reactor, the heat medium fluid flows into and heats the second fixed-bed hydrate reactor, and the hydrate in the second fixed-bed hydrate reactor absorbs heat to be decomposed to release high-concentration $CO_2$ mixed gas and reaction liquid; the refrigerant fluid flows into and cools the first fixed-bed hydrate reactor, and the mixed gas from the raw gas cylinder flows into the first fixed-bed hydrate reactor at a constant flow rate through a booster pump to be subjected to hydrate formation reaction with the reaction liquid from the corresponding cavity body of the solution circulation tank;

(2) the high-concentration $CO_2$ mixed gas flows into the high-concentration $CO_2$ gas cylinder from the exhaust port of the second fixed-bed hydrate reactor, (3) when the hydrate decomposition of the second fixed-bed hydrate reactor is finished, the gas stops flowing out of the second fixed-bed hydrate reactor; the hot reaction liquid flows into the corresponding cavity body of the solution circulation tank from the reaction liquid outlet of the second fixed-bed hydrate reactor to be precooled, and then flows back to the second fixed-bed hydrate reactor through a circulation pump; the heat medium fluid stops flowing into the second fixed-bed hydrate reactor, and the refrigerant fluid flows into and cools the second fixed-bed hydrate reactor;

(4) when the hydrate formation of the first fixed-bed hydrate reactor is finished and the hydrate formation of the second fixed-bed hydrate reactor is started, the raw gas cylinder stops supplying gas to the first fixed-bed hydrate reactor, the reaction liquid stops flowing into the first fixed-bed hydrate reactor, the cold residual reaction liquid flows back to the corresponding cavity body of the solution circulation tank from a reaction liquid outlet of the first fixed-bed hydrate reactor, the residual low-concentration $CO_2$ mixed gas flows out from the exhaust port of the first fixed-bed hydrate reactor to the residual gas storage tank, the refrigerant fluid stops entering the first fixed-bed hydrate reactor, the heat medium fluid flows into and heats the first fixed-bed hydrate reactor, and the hydrate in the first fixed-bed hydrate reactor absorbs heat to be decomposed to release high-concentration $CO_2$ mixed gas and reaction liquid; the refrigerant fluid flows into and cools the second fixed-bed hydrate reactor, and the mixed gas from the raw gas cylinder enters the second fixed-bed hydrate reactor at a constant flow rate through the booster pump to be subjected to hydrate formation reaction with the reaction liquid from the corresponding cavity body of the solution circulation tank;

(5) the high-concentration $CO_2$ mixed gas flows into the high-concentration $CO_2$ gas cylinder from the exhaust port of the first fixed-bed hydrate reactor; and (6) when the hydrate decomposition of the first fixed-bed hydrate reactor is finished, the gas stops flowing out of the first fixed-bed hydrate reactor; the hot reaction liquid flows into the corresponding cavity body of the solution circulation tank from the reaction liquid outlet of the first fixed-bed hydrate reactor to be precooled, and then flows into the first fixed-bed hydrate reactor through the circulation pump; the heat medium fluid stops flowing into the first fixed-bed hydrate reactor, the refrigerant fluid flows into and cools the first fixed-bed hydrate reactor, and step 1) is returned.

In combination with FIG. 2, the method for continuous $CO_2$ capture by a double-bed hydrate process according to the present embodiment is specifically described as follows:

(1) Process of starting of hydrate formation of first fixed bed and hydrate decomposition of second fixed bed The flow path is switched, the first heat medium valve 13e is closed, and the third heat medium valve 13d is opened, so that the heat medium fluid flows into the second fixed-bed hydrate reactor 2; the second heat medium valve 13b is closed and the fourth heat medium valve 13c is opened, so that the heat medium fluid after heat exchange flows back into the condenser 10; at the same time, the third refrigerant valve 13f is closed, and the first refrigerant valve 13g is opened, so that the refrigerant fluid flows into the first fixed-bed hydrate reactor 1; and the fourth refrigerant valve 13a is closed, and the second refrigerant valve 13 is opened, so that the refrigerant fluid after heat exchange flows back into the evaporator 8.

The second drain valve 14l and the second liquid inlet valve 14h are closed, the second gas inlet valve 14k is closed, and the second fixed-bed hydrate reactor 2 is heated; when the temperature of the fixed bed reaches a hydrate decomposition temperature, the second back pressure valve 17a is automatically opened, and the high-concentration $CO_2$ mixed gas released by hydrate decomposition flows out from the second exhaust port 29a and flows into the high-concentration $CO_2$ mixed gas cylinder 7 from the third electromagnetic three-way valve 15b through the second check valve 18a and the second gas flowmeter 19a.

At the same time, the first circulation pump 12 continuously pumps the reaction liquid in the left cavity body of the liquid storage tank 5 into the first fixed-bed hydrate reactor 1; the first gas inlet valve 14d is opened, the gas cylinder continuously supplies gas to the first fixed-bed hydrate reactor 1 at a constant flow through the first electromagnetic three-way valve 15 until the pressure reaches a set value, the first back pressure valve 17 is automatically opened, when the temperature of the porous medium in the first fixed-bed hydrate reactor 1 reaches a set value, the hydrate formation is started, $CO_2$ gas is continuously adsorbed, and the gas that does not participate in the reaction flows into the residual gas storage tank 6 from the second electromagnetic three-way valve 15a by the first check valve 18 and the first gas flowmeter 19 through the first exhaust port 29.

(2) Finishing of hydrate formation of first fixed bed and precooling after decomposition finishing of second fixed bed When it is monitored that the flow values set for the first gas flowmeter 19 and the gas flow controller 26 are the same, it is considered that the first fixed-bed hydrate reactor 1 has reached the maximum $CO_2$ capture capacity, indicating that hydrate formation is finished. At this time, the first gas inlet valve 14d and the first liquid inlet valve 14e are closed, and the residual cold reaction liquid flows back into the left cavity body of the circulation tank 5 through the first drain valve 14c.

In view of the fact that a cold load of the evaporator 8 in the compression-refrigeration system is lower than a heat load of the condenser 10, and formation heat and decomposition heat of the hydrate are basically equal, the excess heat of the condenser is taken away by air cooling on the premise of ensuring the decomposition heat of the hydrate.

Therefore, when it is monitored that the second gas flowmeter 19a is basically zero, it is indicated that the decomposition of the second fixed-bed hydrate reactor 2 is basically finished. The third heat medium valve 13d and the fourth heat medium valve 3c are closed to stop the heat medium fluid from entering the second fixed-bed hydrate reactor 2. At the same time, the second drain valve 14l and the second liquid inlet valve 14h are opened, and the decomposed reaction liquid is pumped back to the right cavity body of the solution tank 5 by the second circulation pump 12c, precooled by the reaction liquid in the left cavity body, and then flows to the second fixed-bed hydrate reactor 2 to continue precooling the porous medium.

(3) Starting of hydrate decomposition of first fixed bed and hydrate formation of second fixed bed The flow path is switched, the third heat medium valve 13d is closed, and the first heat medium valve 13e is opened, so that the heat medium fluid flows into the first fixed-bed hydrate reactor 1; the second heat medium valve 13b is closed, and the fourth heat medium valve 13c is opened, so that the heat medium fluid after heat exchange flows back into the condenser 10; at the same time, the first refrigerant valve 13g is closed, and the third refrigerant valve 13f is opened, so that the refrigerant fluid flows into the second fixed-bed hydrate reactor 2; and the second refrigerant valve 13 is closed, and the fourth refrigerant valve 13a is opened, so that the refrigerant fluid after heat exchange flows back into the evaporator 8.

The first drain valve 14c and the first liquid inlet valve 14c are closed, and the first fixed-bed hydrate reactor 1 is heated; when the temperature of the fixed bed reaches the hydrate decomposition temperature, the first back pressure valve 17 is automatically opened, and the high-concentration $CO_2$ mixed gas released by hydrate decomposition flows out from the first exhaust port 29, and flows into the high-concentration $CO_2$ mixed gas cylinder 7 from the second electromagnetic three-way valve 15a through the first check valve 18 and the first gas flowmeter 19.

At the same time, the second circulation pump 12c continuously pumps the reaction liquid in the right cavity body of the liquid storage tank 5 into the second fixed-bed hydrate reactor 2: the second gas inlet valve 14k is opened, the raw gas cylinder 3 continuously supplies gas to the second fixed-bed hydrate reactor 2 through the first electromagnetic three-way valve 15 at a constant flow until the pressure reaches a set value, and the second back pressure valve 17a is opened: when the temperature of the porous medium in the second fixed-bed hydrate reactor 2 reaches a set value, the hydrate formation is started, and $CO_2$ gas is continuously adsorbed; the gas that does not participate in the reaction flows into the residual gas storage tank 6 from the third electromagnetic three-way valve 15b by the second check valve 18a and the second gas flowmeter 19a through the second exhaust port 29a.

(4) Precooling after finishing of hydrate decomposition of first fixed bed and formation finishing of second fixed bed, returning to process (1)

When it is monitored that the flow values set for the second gas flowmeter 19a and the gas flow controller 26 are the same, it is considered that the second fixed-bed hydrate reactor 2 has reached the maximum $CO_2$ capture capacity, it is indicated that the hydrate formation is finished; at this time, the second gas inlet valve 14k and the second liquid inlet valve 14h are closed, and the residual cold reaction liquid flows back into the right cavity body of the circulation tank 5 through the second drain valve 14l.

When it is monitored that the first gas flowmeter 19 is basically zero, it is indicated that the decomposition of the first fixed-bed hydrate reactor 1 is basically finished; the first heat medium valve 3e and the second heat medium valve 13b are closed to stop the heat medium fluid from entering the second fixed-bed hydrate reactor 2; at the same time, the first drain valve 14c and the first liquid inlet valve 14c are opened, and the decomposed reaction liquid is pumped back to the left cavity body of the solution tank 5 by the first circulation pump 12, precooled by the reaction liquid in the right cavity body, and then flows to the first fixed-bed hydrate reactor 1 to continue precooling the porous medium.

The foregoing embodiments are only for explaining the technical concepts and characteristics of the present invention, and intended to enable those ordinary skilled in the art to understand the content of the present invention and implement it accordingly, without limiting the protection scope of the present invention. All equivalent changes or modifications made according to the essence of the present invention should be included in the protection scope of the present invention.

What is claimed is:

1. A method for continuous $CO_2$ capture by a double-bed hydrate process, implemented based on a device for continuous $CO_2$ capture by a double-bed hydrate process, wherein the device for continuous $CO_2$ capture by the double-bed hydrate process comprises:

a first fixed-bed hydrate reactor and a second fixed-bed hydrate reactor, which are each provided with a heat exchange coil therein and filled with a porous medium;

a compression-refrigeration system, comprising an evaporator, a compressor, a condenser and a throttle valve, which are sequentially connected in series to form a compression-refrigeration circulation loop, wherein the evaporator is respectively connected with the heat exchange coil of the first fixed-bed hydrate reactor and the heat exchange coil of the second fixed-bed hydrate reactor to form a refrigerant fluid circulation loop, so as to provide cool energy for reactor hydrate formation, and the condenser is respectively connected with the heat exchange coil of the first fixed-bed hydrate reactor and the heat exchange coil of the second fixed-bed hydrate reactor to form a heating loop, so as to provide heat for reactor hydrate decomposition;

a solution circulation system, comprising a solution circulation tank, wherein the solution circulation tank comprises two adjacent cavity bodies capable for heat exchange, one cavity body is connected with the first fixed-bed hydrate reactor to form a reaction liquid circulation loop, and the other cavity body is connected with the second fixed-bed hydrate reactor to form a reaction liquid circulation loop;

a gas inlet system, comprising a raw gas cylinder which is respectively connected with a raw gas inlet of the first fixed-bed hydrate reactor and a raw gas inlet of the second fixed-bed hydrate reactor through pipelines; and an exhaust system, comprising a residual gas storage tank and a high-concentration $CO_2$ gas cylinder, wherein the residual gas storage tank and the high-concentration $CO_2$ gas cylinder are respectively connected with an exhaust port of the first fixed-bed hydrate reactor and an exhaust port of the second fixed-bed hydrate reactor through pipelines; wherein a refrigerant fluid and a heat medium fluid output by the compression-refrigeration system alternately flow into the heat exchange coil of the first fixed-bed hydrate reactor and the heat exchange coil of the second fixed-bed hydrate reactor, and the two fixed-bed hydrate reactors are alternately subjected to hydrate formation and decomposition reactions to realize continuous $CO_2$ capture and separation-;

further comprising a data acquisition and control system, which is electrically connected with sensing elements of the first fixed-bed hydrate reactor, the second fixed-bed hydrate reactor, the compression-refrigeration system, the solution circulation system and the exhaust system respectively, so as to acquire and process sensing signals of respective sensing elements and automatically control operation of the method;

the method comprises the following steps:

(1) when the hydrate formation of the second fixed-bed hydrate reactor is finished and the hydrate formation of the first fixed-bed hydrate reactor is started, the raw gas cylinder stops supplying gas to the second fixed-bed hydrate reactor, the reaction liquid stops flowing into the second fixed-bed hydrate reactor, the cold residual reaction liquid flows back to the corresponding cavity body of the solution circulation tank from a reaction liquid outlet of the second fixed-bed hydrate reactor, residual low-concentration $CO_2$ mixed gas flows out from the exhaust port of the second fixed-bed hydrate reactor to the residual gas storage tank, the refrigerant fluid stops entering the second fixed-bed hydrate reactor, the heat medium fluid flows into and heats the second fixed-bed hydrate reactor, and the hydrate in the second fixed-bed hydrate reactor absorbs heat to be decomposed to release high-concentration $CO_2$ mixed gas and reaction liquid; the refrigerant fluid flows into and cools the first fixed-bed hydrate reactor, and the mixed gas from the raw gas cylinder flows into the first fixed-bed hydrate reactor at a constant flow rate through a booster pump to be subjected to hydrate formation reaction with the reaction liquid from the corresponding cavity body of the solution circulation tank;

(2) the high-concentration $CO_2$ mixed gas flows into the high-concentration $CO_2$ gas cylinder from the exhaust port of the second fixed-bed hydrate reactor;

(3) when the hydrate decomposition of the second fixed-bed hydrate reactor is finished, the gas stops flowing out of the second fixed-bed hydrate reactor; the hot reaction liquid flows into the corresponding cavity body of the solution circulation tank from the reaction liquid outlet of the second fixed-bed hydrate reactor to be precooled, and then flows back to the second fixed-bed hydrate reactor through a circulation pump; the heat medium fluid stops flowing into the second fixed-bed hydrate reactor, and the refrigerant fluid flows into and cools the second fixed-bed hydrate reactor;

(4) when the hydrate formation of the first fixed-bed hydrate reactor is finished and the hydrate formation of the second fixed-bed hydrate reactor is started, the raw gas cylinder stops supplying gas to the first fixed-bed hydrate reactor, the reaction liquid stops flowing into the first fixed-bed hydrate reactor, the cold residual reaction liquid flows back to the corresponding cavity body of the solution circulation tank from a reaction liquid outlet of the first fixed-bed hydrate reactor, the residual low-concentration $CO_2$ mixed gas flows out from the exhaust port of the first fixed-bed hydrate reactor to the residual gas storage tank, the refrigerant fluid stops entering the first fixed-bed hydrate reactor, the heat medium fluid flows into and heats the first fixed-bed hydrate reactor, and the hydrate in the first fixed-bed hydrate reactor absorbs heat to be decomposed to release high-concentration $CO_2$ mixed gas and reaction liquid; the refrigerant fluid flows into and cools the second fixed-bed hydrate reactor, and the mixed gas from the raw gas cylinder enters the second fixed-bed hydrate reactor at a constant flow rate through the booster pump to be subjected to hydrate formation reaction with the reaction liquid from the corresponding cavity body of the solution circulation tank;

(5) the high-concentration $CO_2$ mixed gas flows into the high-concentration $CO_2$ gas cylinder from the exhaust port of the first fixed-bed hydrate reactor; and (6) when the hydrate decomposition of the first fixed-bed hydrate reactor is finished, the gas stops flowing out of the first fixed-bed hydrate reactor; the hot reaction liquid flows into the corresponding cavity body of the solution circulation tank from the reaction liquid outlet of the first fixed-bed hydrate reactor to be precooled, and then flows into the first fixed-bed hydrate reactor through the circulation pump; the heat medium fluid stops flowing into the first fixed-bed hydrate reactor, the refrigerant fluid flows into and cools the first fixed-bed hydrate reactor, and step 1) is returned.

2. The method for continuous $CO_2$ capture by the double-bed hydrate process according to claim 1, wherein a compression-refrigeration circulation working medium is R410A, and the heat medium fluid and the refrigerant fluid are both a 50% ethylene glycol-water solution.

3. The method for continuous $CO_2$ capture by the double-bed hydrate process according to claim 1, wherein the porous medium is selected from one of silica gel, quartz sand, SBA-15, CMK-3 and ZIF-8.

4. The method for continuous $CO_2$ capture by the double-bed hydrate process according to claim 1, wherein a reaction liquid is selected from at least one of SDS, THF and a TBAB aqueous solution.

5. The method for continuous $CO_2$ capture by the double-bed hydrate process according to claim 4, wherein a concentration of the reaction liquid is 0-20 wt %.

6. The method for continuous $CO_2$ capture by the double-bed hydrate process according to claim 1, wherein a top center of the solution circulation tank is provided with a reaction liquid inlet connected with a spray nozzle, and a bottom center of the solution circulation tank is provided with a drain port for replacing a liquid in the solution circulation tank.

* * * * *